Nov. 19, 1929.  J. H. DAVIDSON  1,736,582
APRON CONVEYER
Filed June 1, 1927  3 Sheets-Sheet 1
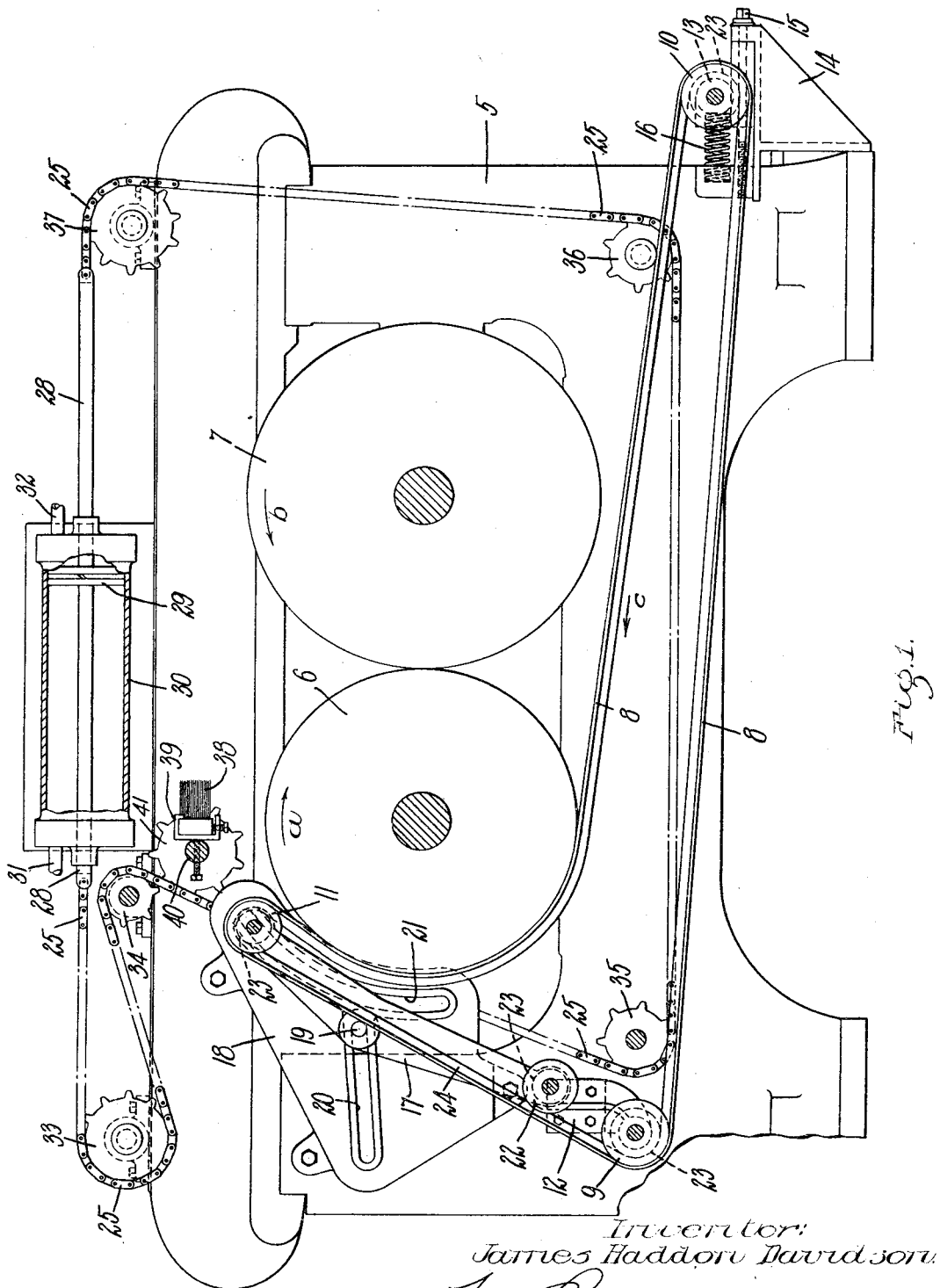
Inventor:
James Haddon Davidson
by Charles S. Gooding, Atty.

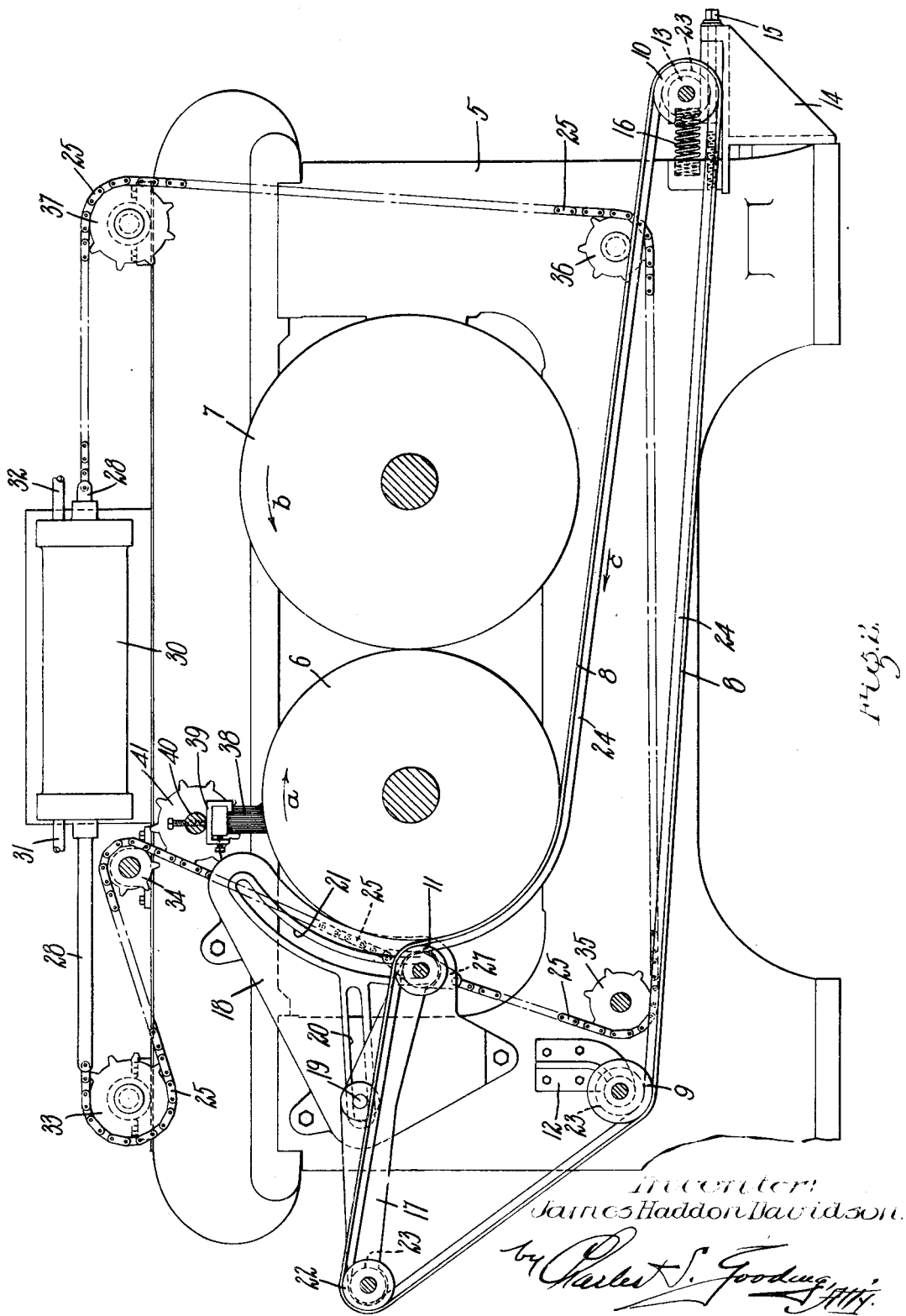

Nov. 19, 1929.                J. H. DAVIDSON                 1,736,582
                               APRON CONVEYER
                             Filed June 1, 1927         3 Sheets-Sheet 3
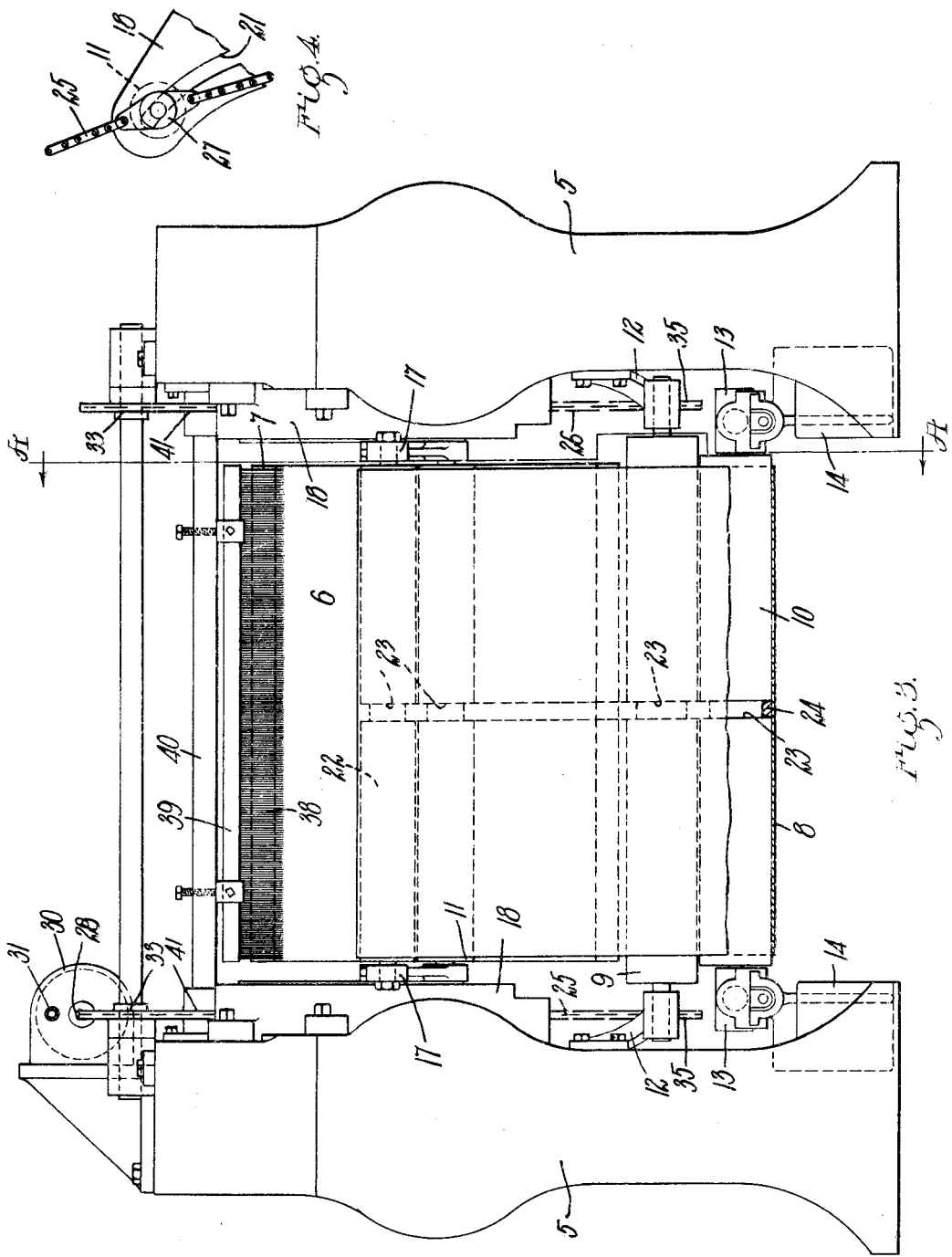
Inventor:
James Haddon Davidson
by Charles L. Gooding Patented Nov. 19, 1929

1,736,582

UNITED STATES PATENT OFFICE

JAMES HADDON DAVIDSON, OF WATERTOWN, MASSACHUSETTS, ASSIGNOR TO HOOD RUBBER COMPANY, OF WATERTOWN, MASSACHUSETTS, A CORPORATION OF MASSACHUSETTS

APRON CONVEYER

Application filed June 1, 1927. Serial No. 195,791.

This invention relates to an apron conveyer and has for its object to provide a conveyer of the type mentioned and particularly adapted for use in connection with a machine for mixing and grinding rubber stock, as for example, scrap rubber, the conveyor being so associated with said machine and particularly with the grinding rolls thereof that the rubber stock passing between said rolls will be deposited upon said conveyer, and the latter co-operating with one of the rolls will continue to redeliver the stock to the rolls until such time as said stock has been thoroughly ground and mixed, whereupon a portion of the course of the conveyer is changed, so that the stock may be discharged therefrom at a point removed from the grinding rolls.

Another object of the invention is to provide a novel mechanism for changing the course of the conveyer as hereinbefore mentioned, said mechanism being actuated by fluid pressure, preferably pneumatic.

Still another object of the invention is to provide a means for cleaning the periphery of one of the grinding rolls, said means being out of engagement with said roll during the grinding operation and being automatically moved into engagement with said roll by the mechanism which changes the course of the conveyer when said mechanism is actuated to discharge the stock therefrom.

The main and underlying object of the invention is to eliminate manual labor in the handling of the rubber stock during the mixing and grinding operation.

The invention consists in a conveyer as set forth in the following specification and particularly as pointed out in the claims thereof.

Referring to the drawings:—

Figure 1 is a vertical sectional elevation taken on the line A—A of Fig. 3, looking in the direction of the arrows on said line, the conveyer belt being positioned to redeliver to the grinding rolls material deposited thereon by said rolls.

Fig. 2 is a view similar to Fig. 1, illustrating the conveyer belt in position to discharge the material deposited thereon by the grinding rolls away from said rolls.

Fig. 3 is an end elevation of the machine as viewed from the left of Fig. 2.

Fig. 4 is a detail view illustrating the manner of connecting the drive chain from the piston of the pressure cylinder to one of the guide rolls.

Like numerals refer to like parts throughout the several views of the drawing.

In the drawings, 5 represents the side frames of a grinding machine for rubber stock and 6 and 7 represent the grinding rolls for said machine, said rolls being mounted in any suitable manner upon the side frames 5.

The machine is of a type well known to those skilled in the art and the rubber stock is mixed and ground simultaneously as it passes between the rolls 6 and 7.

The apron conveyer comprising this invention embodies therein an endless conveyer belt 8 which is so positioned relatively to the grinding roll 6 that it is held in frictional engagement with and is driven by said roll.

The belt 8, when located in its normal position, as illustrated in Fig. 1, is mounted upon rollers 9, 10 and 11, the roller 9 being permanently mounted upon a bracket 12, and the roller 10 constituting a take-up roller and being mounted in a bearing 13 which is slidably mounted upon a bracket 14. The bearing 13, carrying the roller 10, is adjusted relatively to the frame 5 by an adjusting screw 15, and a spring 16 is interposed between the frame 5 and bearing 13 to place a tension upon the belt 8.

The roller 11 is mounted at its opposite ends in a pair of rocker arms 17, each of which is in turn mounted on a guide frame 18 which is fastened to the inner surface of a side frame 5. Each rocker arm 17 is provided with a pivot 19 which is mounted to slide within a straight slot 20 provided in its guide frame 18. The opposite end portions of the roller 11 project through a curved slot 21, which is also provided in each guide frame 18, and said rocker arms may, therefore, rock upon their pivots 19 and the latter may slide within the slots 20 and at the same time the end portions of the roller 11 will move upwardly and downwardly within the curved slots 21. The roller 11 always acts to hold the belt 9 in frictional engagement with a portion of the periphery of the grinding roll 6 and when said belt 8 is being utilized to redeliver to the grinding rolls the material deposited thereon by said rolls, the roller 11 is positioned adjacent to the top of the slot 21 as illustrated in Fig. 1.

The pivots 19 of the rocker arms 17 are located approximately midway the length of said arms and located at the opposite end of the arms from the roller 11 is another roller 22.

When the belt 8, rocker arm 17 and roller 11 are positioned as illustrated in Fig. 1, the roller 22 is idle and out of engagement with the belt 8. When, however, the material being acted upon by the rolls 6 and 7 has been sufficiently mixed and ground, and it is desired to change the course of the belt 8 to discharge said material from said belt, the rocker arms 17 are moved within their respective guide frames 18 to position said rocker arms as illustrated in Fig. 2, the roller 11 being lowered to a point midway the height of the roll 6 and the roller 22 being moved into engagement with the belt 8 at a point some distance removed from the periphery of the roll 6.

The rollers 9, 10, 11 and 22 are all provided with an annular groove 23 which extends around the periphery intermediate the ends thereof, and the belt 8 has a guide strip 24 fastened to one side thereof, said guide strip being provided for the purpose of projecting into the grooves of the various rollers and thereby positioning the belt 8 upon said rollers.

The rocker arms 17 carrying the rollers 11 and 22 are moved in unison from the position illustrated in Fig. 1 to the position illustrated in Fig. 2 by chains 25 and 26, both of which in effect are endless chains and travel in identical paths upon opposite sides of the machine. The end portions of the roller 11 are rotatably mounted in a special form of link 27 which is embodied in each of the chains 25 and 26 as illustrated in Fig. 4.

The chain 25 constitutes a drive chain and is fastened at its opposite ends to the opposite extremities of a piston rod 28, said piston rod projecting from the opposite sides of a piston 29 which is mounted in a pressure cylinder 20. The piston 29 is adapted to have a reciprocatory motion imparted thereto within the cylinder 30 by any suitable form of pressure fluid, as for example, steam or compressed air, said fluid being conducted to the opposite end portions of the cylinder 30 in a well-known manner by delivery pipes 31 and 32. The chains 25 and 26 are each guided by sprockets 33, 34, 35, 36 and 37, all of which are mounted in suitable bearings provided upon the side frames 5.

As it is desirable to clean the periphery of the mixing roll 6 occasionally, a brush 38 is provided for said roll, said brush being mounted in a holder 39 which, in turn, is adjustably secured to a shaft 40. The brush 38 is moved into and out of engagement with the periphery of the roll 6 by sprockets 41 which are rigidly fastened to the shaft 40 and so positioned thereon as to be rotated by the chains 25 and 26.

When the belt 8 is positioned as illustrated in Fig. 1 and the rolls 6 and 7 are performing the mixing and grinding operation upon the material, the brush 38 is out of engagement with the periphery of the roll 6, being located in the position illustrated in Fig. 1, but when the chains 25 and 26 are moved to change the course of the belt 8, the brush 38 will be rotated into engagement with the roll 6 and will continue in engagement therewith as long as the belt is positioned as illustrated in Fig. 2, and when said belt is returned to its position to redeliver the material to the grinding rolls, the brush will be again moved out of engagement with the roll 6 and out of the path of the material passing over said roll.

The general operation of the mechanism hereinbefore specifically described is as follows:—

During the operation of grinding and mixing the material, the rolls 6 and 7 are moving in the direction of the arrows $a$ and $b$ respectively and the belt 8 is moving in the direction of the arrow $c$ to redeliver to said rolls the material deposited thereon by said rolls, and this movement will continue until the material has been thoroughly mixed and ground, at which time it is desirable to deliver the material into a suitable container or receptacle away from the mixing rolls.

To accomplish this result the pressure fluid is admitted in a well-known manner to the interior of the cylinder 30 through the pipe 32, thereby forcing the piston 29 toward the left in Fig. 1 and through the chains 25 and 26, moving the rocker arms 17 in their guide frames 18 until the roller 11 has reached the bottom of the slot 21 in said guide frames, at which time the roller 22 will be brought into engagement with the belt 8, as illustrated in Fig. 2, taking up the slack in said belt caused by changing the location of the roller 11. This change in the course of the belt 8 will cause the material to travel along said belt between the rollers 11 and 22 and said material will fall from the belt at the roller 22. During the interval that the material is being discharged by the belt away from the grinding rolls, the periphery of the roll 6 is cleaned by the brush 38.

After the material has all been discharged by the belt, the pressure fluid is admitted to the cylinder 30 through the pipe 31, thereby reversing the movement of the piston 29, and the belt is again returned to the position illustrated in Fig. 1 and another batch of material is placed upon said belt to be mixed and ground. During this operation of the belt 8 the brush 38 is out of engagement with the roll 6 and does not interfere with the movement of the material thereover.

I claim:—

1. A conveyer having, in combination, a pair of grinding rolls, an endless belt adapted to redeliver to said grinding rolls material deposited thereon by said rolls, a roller over which said belt travels, said roller holding said belt continually in frictional contact with one of said grinding rolls, and means to move said roller to change the position of the axis thereof, whereby the material may be discharged by said belt away from the grinding rolls.

2. A conveyer having, in combination, a pair of grinding rolls, a belt driven by one of said rolls and co-operating therewith to redeliver to said rolls material deposited thereon by said rolls, a roller over which said belt travels, and means to move said roller to change the course of said belt and continue to hold the same in contact with the grinding roll, whereby the material may be discharged by said belt away from the grinding rolls.

3. A conveyer having, in combination, a pair of grinding rolls, a belt driven by one of said rolls and co-operating therewith to redeliver to said rolls material deposited thereon by said rolls, a pair of guide frames, a roller mounted on said frames and over which said belt travels, and means to move said roller on said frames to change the course of said belt and at the same time continue to hold the belt in contact with its driving roll, whereby the material may be discharged by said belt and away from the grinding rolls.

4. A conveyer having, in combination, a pair of grinding rolls, a belt driven by one of said rolls and co-operating therewith to redeliver to said rolls material deposited thereon by said rolls, a pair of guide frames, a rocker arm slidably mounted on each of said guide frames respectively, a roller mounted on said rocker arms and over which said belt travels, and means to move said arms in unison to change the position at which the material is discharged by said belt.

5. A conveyer having, in combination, a pair of grinding rolls, an endless belt driven by one of said rolls and adapted to redeliver to said rolls material deposited thereon by said rolls, a roller over which said belt travels, a brush for one of the grinding rolls, and means to both move said brush into engagement with said grinding roll and to move said roller to change its location, whereby the material may be discharged by the belt away from the grinding rolls.

6. A conveyer having, in combination, a pair of grinding rolls, an endless belt adapted to redeliver to said rolls material deposited thereon by said rolls, a roller over which said belt travels, said roller holding the belt in frictional engagement with one of the grinding rolls, and means to move said roller to change its location relatively to said last-mentioned grinding roll and at the same time continue to hold the belt in contact therewith, whereby the material may be discharged by the belt and away from the grinding rolls.

7. A conveyer having, in combination, a pair of grinding rolls, an endless belt adapted to redeliver to said rolls material deposited thereon by said rolls, a roller over which said belt travels, said roller holding the belt in frictional engagement with one of the grinding rolls, means to move said roller to change its location relatively to said last-mentioned grinding roll, whereby the material may be discharged from the belt and away from the grinding rolls, and means to guide said roller and hold said belt in engagement with the grinding roll during said movement.

8. A conveyer having, in combination, a pair of grinding rolls, a belt driven by one of said rolls and co-operating therewith to redeliver to said rolls material deposited thereon by said rolls, a pair of guide frames, a rocker arm slidably mounted on each of said guide frames respectively, a roller mounted on said rocker arms and over which said belt travels, and fluid pressure actuating means to move said rocker arms to change the location of said roller, whereby the material may be discharged by the belt and away from the grinding rolls.

9. A conveyer having, in combination, a pair of grinding rolls, a belt driven by one of said rolls and co-operating therewith to redeliver to said rolls material deposited thereon by said rolls, a pair of guide frames, a rocker arm slidably mounted on each of said guide frames respectively, a roller mounted on said rocker arms and over which said belt travels, a cylinder, and a piston located within said cylinder and operatively connected to one of said rocker arms, whereby said arms are actuated in unison to move said roller to change the position at which the material is discharged by said belt.

10. A conveyer having, in combination, a pair of grinding rolls, a belt driven by one of said rolls and co-operating therewith to redeliver to said rolls material deposited thereon by said rolls, a pair of guide frames, a rocker arm mounted on each of said guide frames respectively, a roller mounted on said rocker arms and over which said belt travels, a cylinder, a piston located within said cylinder, means embodying therein a chain operatively connecting said piston to one of said rocker arms, whereby said arms are actuated in unison to move said roller to change the position at which the material is discharged by the belt, and a brush normally out of engagement with one of said grinding rolls and adapted to be moved by said chain into engagement therewith.

11. A conveyer having, in combination, a pair of grinding rolls, a belt driven by one of said rolls and co-operating therewith to redeliver to said rolls material deposited thereon said rolls, a pair of guide frames, a rocker arm mounted on each of said guide frames respectively, a roller mounted on said rocker arms and over which said belt travels, another roller also mounted on said rocker arms, said last-named roller normally being idle and out of contact with said belt, and means to move said rocker arms in unison to change the position at which the material is discharged from the belt and to move the idle roller into contact with the belt at the point where the material is discharged therefrom.

12. A conveyer having, in combination, a pair of grinding rolls, a belt driven by one of said rolls and co-operating therewith to redeliver to said rolls material deposited thereon by said rolls, a pair of guide frames, a rocker arm slidably mounted on each of said guide frames respectively, a roller mounted on said rocker arms and over which said belt travels, said roller holding said belt in frictional engagement with one of said grinding rolls, another roller also mounted on said rocker arms and normally out of contact with said belt, and means to move said rocker arms in unison, whereby said last-named roller is moved into contact with said belt, the course of the belt changed, and the material discharged from said belt and away from the grinding rolls.

13. A conveyer having, in combination, a pair of grinding rolls, a belt driven by one of said rolls and co-operating therewith to redeliver to said rolls material deposited thereon by said rolls, a pair of guide frames, a rocker arm slidably mounted on each of said guide frames respectively, a roller mounted on said rocker arms and over which said belt travels, said roller holding said belt in frictional engagement with one of said grinding rolls, another roller also mounted on said rocker arms and normally out of contact with said belt, a pressure cylinder, a piston in said cylinder and flexible means operatively connecting said piston to one of said rocker arms, whereby said last-named roller is moved into contact with said belt, the course of said belt changed, and the material discharged from said belt and away from the grinding rolls.

14. A conveyer having, in combination, a pair of grinding rolls, a belt driven by one of said rolls and co-operating therewith to redeliver to said rolls material deposited thereon by said rolls, a guide strip fast to said belt, a pair of guide frames, a rocker arm slidably mounted on each of said guide frames respectively, a roller mounted on said rocker arms and over which said belt travels, said roller holding said belt in frictional engagement with one of said grinding rolls, another roller also mounted on said rocker arms and normally out of contact with said belt, a take-up roller for said belt, all of said rollers being provided with a groove therein to receive said guide strip, and means to move said rocker arms in unison, whereby the rollers thereon are moved to change the position at which the material is discharged from said belt.

In testimony whereof I have hereunto set my hand.

JAMES HADDON DAVIDSON.